United States Patent
MacArthur et al.

(10) Patent No.: US 9,156,638 B2
(45) Date of Patent: Oct. 13, 2015

(54) APPARATUS FOR MARKING AND ORDERING PLATE BLANKS, AND LOAD AND RECEIVING MAGAZINES THEREFOR

(71) Applicant: Honda Motor Co., Ltd., Tokyo (JP)

(72) Inventors: Benjamin B. MacArthur, Barrie (CA); Tony Vandenbroek, Tottenham (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/092,599

(22) Filed: Nov. 27, 2013

(65) Prior Publication Data

US 2015/0061210 A1    Mar. 5, 2015

(30) Foreign Application Priority Data

Sep. 5, 2013    (CA) .................................... 2826378

(51) Int. Cl.
| | |
|---|---|
| B65H 1/14 | (2006.01) |
| B65H 3/24 | (2006.01) |
| B65H 5/16 | (2006.01) |
| B65H 29/00 | (2006.01) |
| B65H 31/08 | (2006.01) |
| B65H 83/00 | (2006.01) |
| B65H 31/00 | (2006.01) |
| B65H 1/04 | (2006.01) |

(52) U.S. Cl.
CPC .. B65H 3/24 (2013.01); B65H 1/04 (2013.01); B65H 1/14 (2013.01); B65H 5/16 (2013.01); B65H 29/00 (2013.01); B65H 31/00 (2013.01); B65H 31/08 (2013.01); B65H 83/00 (2013.01)

(58) Field of Classification Search
CPC ............ B65H 1/04; B65H 3/24; B65H 3/242; B65H 5/16; B65H 29/00; B65H 31/00; B65H 83/00; B65H 2404/73
USPC ........ 271/3.14, 4.01, 4.04, 4.11, 269, 84, 212
See application file for complete search history.

(56) References Cited

U.S. PATENT DOCUMENTS

| | | | | |
|---|---|---|---|---|
| 1,448,314 | A | * | 3/1923 | Pedrick ......................... 271/4.01 |
| 1,652,698 | A | * | 12/1927 | Boettger .................... 414/795.3 |
| 2,549,975 | A |   | 4/1951 | Knitter |

(Continued)

FOREIGN PATENT DOCUMENTS

| | | |
|---|---|---|
| DE | 19612831 | 8/1997 |
| DE | 19808801 | 9/1999 |
| EP | 0091579 | 10/1983 |

OTHER PUBLICATIONS

Examiner's Report of CA Application No. 2,826,378 dated May 29, 2015, 3 pages.

*Primary Examiner* — David H Bollinger
(74) *Attorney, Agent, or Firm* — Rankin, Hill & Clark LLP (57) ABSTRACT

An apparatus for marking indicia on a plate blank where plate blanks are successively presented from a load magazine and moved to a printing station where the indicia is marked thereon and produce a finished plate. The finished plate is then moved into a receiving magazine where it is added to a stack of previously finished plates in a predetermined order corresponding the order in which the finished plates are produced. Also provided herein as a load magazine for presenting and having dispensed therefrom successive single plate blanks at a load magazine opening and a receiving magazine for receiving and stacking finished plates in a predetermined order.

13 Claims, 9 Drawing Sheets

(56) References Cited

U.S. PATENT DOCUMENTS

| | | | |
|---|---|---|---|
| 3,335,699 A * | 8/1967 | Aiken et al. ............... 118/76 |
| 3,993,300 A * | 11/1976 | Dehner ..................... 271/4.11 |
| 4,068,767 A * | 1/1978 | Tippetts ................... 414/788.4 |
| 4,255,073 A * | 3/1981 | Schottle ................... 414/788.7 |
| 4,919,741 A | 4/1990 | Chirhart et al. |
| 5,126,577 A | 6/1992 | Trent |
| 5,227,194 A | 7/1993 | De La Sierra |
| 5,393,590 A | 2/1995 | Caspari |
| 5,479,853 A | 1/1996 | Carroll et al. |
| 5,587,036 A | 12/1996 | Utsch et al. |
| 5,759,330 A | 6/1998 | De Neefe |
| 6,467,404 B1 | 10/2002 | Griffin et al. |
| 6,668,456 B1 | 12/2003 | Moser et al. |
| 6,685,014 B1 | 2/2004 | Dunford |
| 8,186,399 B2 | 5/2012 | Tappan |
| 8,365,569 B2 | 2/2013 | Frauchiger |
| 8,413,581 B2 | 4/2013 | Lassen |
| 8,425,705 B2 | 4/2013 | Bouvet et al. |
| 8,459,087 B2 | 6/2013 | Konig |
| 2011/0281041 A1 | 11/2011 | Mazini et al. |
| 2012/0198737 A1 | 8/2012 | Diaz Lopez |
| 2013/0049261 A1 | 2/2013 | Kirpestein |

* cited by examiner

APPARATUS FOR MARKING AND ORDERING PLATE BLANKS, AND LOAD AND RECEIVING MAGAZINES THEREFOR

REFERENCE TO CO-PENDING APPLICATION

The present application is related to and claims benefit of priority to Canadian Patent Application Serial number 2,826, 378, filed Sep. 5, 2013 and entitled "APPARATUS FOR MARKING AND ORDERING PLATE BLANKS, AND LOAD AND RECEIVING MAGAZINES THEREFOR", the subject matter of which is hereby fully incorporated herein by reference.

TECHNICAL FIELD

The present disclosure relates to plate marking systems, and, in particular, to apparati for making and ordering plate blanks, and load and receiving magazines therefor.

BACKGROUND

In assembly line production settings, among other settings, identification plates and other plates requiring pertinent information to be printed thereon are often needed to be produced such that the plates can be later affixed to or provided with a corresponding product. For example, in the production of automobiles in assembly line situations, vehicle identification plates (VIN) are produced and are required to be affixed to a particular corresponding vehicle. The VIN plates are generally produced at a different time and/or in a different location from the vehicle and then transported to the location where such automobiles are being produced and later must be affixed to the correct vehicle.

Given that it is imperative that the correct VIN plate be provided for affixation to the correct corresponding vehicle, the ordering of plates having information printed thereon, the finished plates, in a stack of plates is important. Therefore to ensure that the correct plate is matched to the correct vehicle, the ordering of the finished plates in a stack comprised of a plurality of the finished plates is important. The correct ordering of the finished plates, in sequential order, helps to ensure that as a particular vehicle is produced, the correct matching plate can easily be removed from one end of the stack and affixed to the vehicle.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

There is a need for an apparatus for making and ordering plate blanks, and load and receiving magazines therefor, that overcome some of the drawbacks of known techniques, or at least, provide the public with a useful alternative.

For example, it would be desirable to provide a system where a plurality of plate blanks can be provided, the plate blanks then individually having information marked thereon corresponding to a particular customizable product to produce a finished plate. The finished plates then being sequentially ordered for later use such that the order of the plates in a stack corresponds to the order of a given production run of the customizable products. It would also be desirable to provide a load magazine capable of holding a plurality of plate blanks and successively presenting a single plate blank as a previously presented plate blank is dispensed or removed from the load magazine. Additionally, it would also be desirable to provide a receiving magazine operable to successively receive therein single plates that are ordered in the sequence of insertion into the receiving magazine.

In one aspect there is provided an apparatus for feeding successive plate blanks through an indicia marking process so as to produce finished plates stacked and ordered in a receiving magazine. The apparatus comprises a load magazine operably configured to hold a plurality of plate blanks and successively present a single plate blank at a load magazine opening thereof. An actuator arm operable to interact with the single plate blank at the opening to linearly move the single plate blank along a travel path through the indicia marking process to successively produce the finished plates is also provided. Once through the indicia marking process the finished plates are successively delivered by the actuator arm into the receiving magazine via a receiving magazine opening thereof such that the finished plates are successively inserted in order into the receiving magazine adjacent previously finished plates maintained in the receiving magazine so as to form the stack of finished plates.

In some embodiments, the load magazine opening is located at a load magazine top end region.

In some embodiments, the receiving magazine opening is located in a side wall of a receiving magazine housing configured to receive therethrough a single plate into the receiving magazine housing. In some embodiments, the receiving magazine opening is provided as a slot. Furthermore, in some embodiments, the edges of the slot are contoured for aligning said finished plate into said slot.

In some embodiments, the finished plates are installed under said previously finished plates, thereby being adjacent to a previously finished plate.

In some embodiments, the receiving magazine includes a deflection member having a beveled leading edge located within the receiving magazine housing. In some embodiments, the beveled leading edge is operably aligned with the receiving magazine opening for deflecting the finished plates under the previously finished plates maintained in the receiving magazine.

In some embodiments, the receiving magazine further comprises a receiving magazine housing top opening for removing said finished plates stacked and ordered in said receiving magazine. In some embodiments, there is provided at least one retaining member in reversible communication with the receiving magazine housing top opening for selectively preventing the finished plates from exiting said receiving magazine house top opening.

In some embodiments, the actuator arm has an effector end region adapted for engaging an edge of the single plate blank for removing the single plate blank from the load magazine opening. In some embodiments the effector end region in engaging with the single plate blank pushes the single plate blank into the indicia marking process for marking indicia on the single plate blank and producing the finished plate. Furthermore, in some embodiments, the actuator arm further effects pushing of the finished plates into the receiving magazine opening.

In some embodiments, the plurality of plate blanks are maintained in the load magazine in a stacked arrangement.

In some embodiments, there is provided a biasing means configured for advancing the plurality of plate blanks towards the load magazine opening such that the single plate blanks are successively presented for interaction with the actuator arm.

In some embodiments, the load magazine opening includes at least one tab for abutting thereagainst at least a portion of a top surface of the single plate blank and a beveled leading edge located in the direction of travel of the actuator arm. The load magazine opening has a trailing side configured to allow dispensing of the single plate blank from the load magazine by an effector end region of the actuator arm.

In some embodiments, the apparatus further comprises a printing station plate blank stopper operable to selectively depend through a support surface on which the single plate blank is linearly moved. The printing station plate blank stopper is operable to depend through the support surface for abutting thereagainst and aligning the single plate blank in the indicia marking process. Once the indicia marking process is completed, the printing station plate blank stopper is retracted below the support surface and the now finished plate can be moved by the effect of the actuator arm towards the receiving magazine.

In some embodiments, the indicia marking process is provided through a printing station having a printing head. In various embodiments, the printing head may be provided as a laser etching head, an ink printing head, an embossing head or an engraving head for marking the indicia on the single plate blank. Furthermore, in some embodiments, the printing station is adapted to receive predetermined information corresponding to the indicia to be marked on the single plate blank to produce the finished plate via the printing head. The predetermined information is provided in a predetermined sequence corresponding to desired markings for sequentially marking the presented single plate blanks such that the finished plates are produced in a predetermined order. In some embodiments, the printing station receives the predetermined information from a data storage device.

In another aspect, there is provided a load magazine for holding a plurality of plate blanks in a stacked arrangement and adapted to successively present a single one of the plate blanks to be dispensed from the load magazine. The load magazine comprises a load magazine housing configured to hold a stack of the plurality of plate blanks and means for advancing the stack towards a load magazine opening located at a top end region of the housing. The load magazine opening includes at least one tab for abutting thereagainst at least a portion of a top surface of the single one of the plate blanks and a beveled leading edge located in the direction of travel of an actuator arm. The load magazine opening has a trailing side configured to allow dispensing of the single one of the plurality of plate blanks substantially perpendicularly to the orientation of the stack from the load magazine by the actuator arm. Furthermore, the load magazine includes means for advancing the stack towards the load magazine opening to present a subsequent plate at said load magazine opening once the single one of the plate blanks is dispensed.

In some embodiments, the means for advancing the stack towards the load magazine opening comprises biasing means operably located within the load magazine housing to push the stack towards the load magazine opening. In some embodiments the biasing means is provided as at least one coil spring.

In yet another aspect, there is provided a receiving magazine for receiving plates in a stacked arrangement. The receiving magazine comprises a receiving magazine housing configured to hold a stack of plates and a receiving magazine opening located in a side wall of the receiving magazine housing configured to receive therethrough a single plate into the receiving magazine housing. A deflection member located within the receiving magazine housing having a beveled leading edge is also provided. The beveled leading edge is operably aligned with the receiving magazine opening for deflecting the single plate under the stack of plates so as to add successive plates to the stack of plates as subsequent plates are inserted through the receiving magazine opening.

In some embodiments, the receiving magazine opening is provided as a slot. Furthermore, in some embodiments, the edges of the slot are contoured for aligning the plate with the slot.

In some embodiments, the receiving magazine further includes a receiving magazine housing top opening for removing therethrough the stack of plates. In some embodiments, there is provided at least one retaining member in reversible communication with the receiving magazine housing top opening for selectively preventing the plates from exiting the receiving magazine house top opening.

Other aims, objects, advantages and features of the invention will become more apparent upon reading of the following non-restrictive description of specific embodiments thereof, given by way of example only with reference to the accompanying drawings.

BRIEF DESCRIPTION OF THE FIGURES

In order that the invention may be better understood, exemplary embodiments will now be described by way of example only, with references to the accompanying drawings, wherein:

FIG. 2b is a top perspective view of an insert plate of the load magazine of FIG. 2a;

FIG. 3 is a partial cut-away side view from a trailing side of the load magazine of FIG. 2a;

DETAILED DESCRIPTION

With reference to the disclosure herein and the appended figures, an apparatus for making and ordering plate blanks, and load and receiving magazines therefor will now be described, in accordance with different embodiments of the invention.

Figure 1:
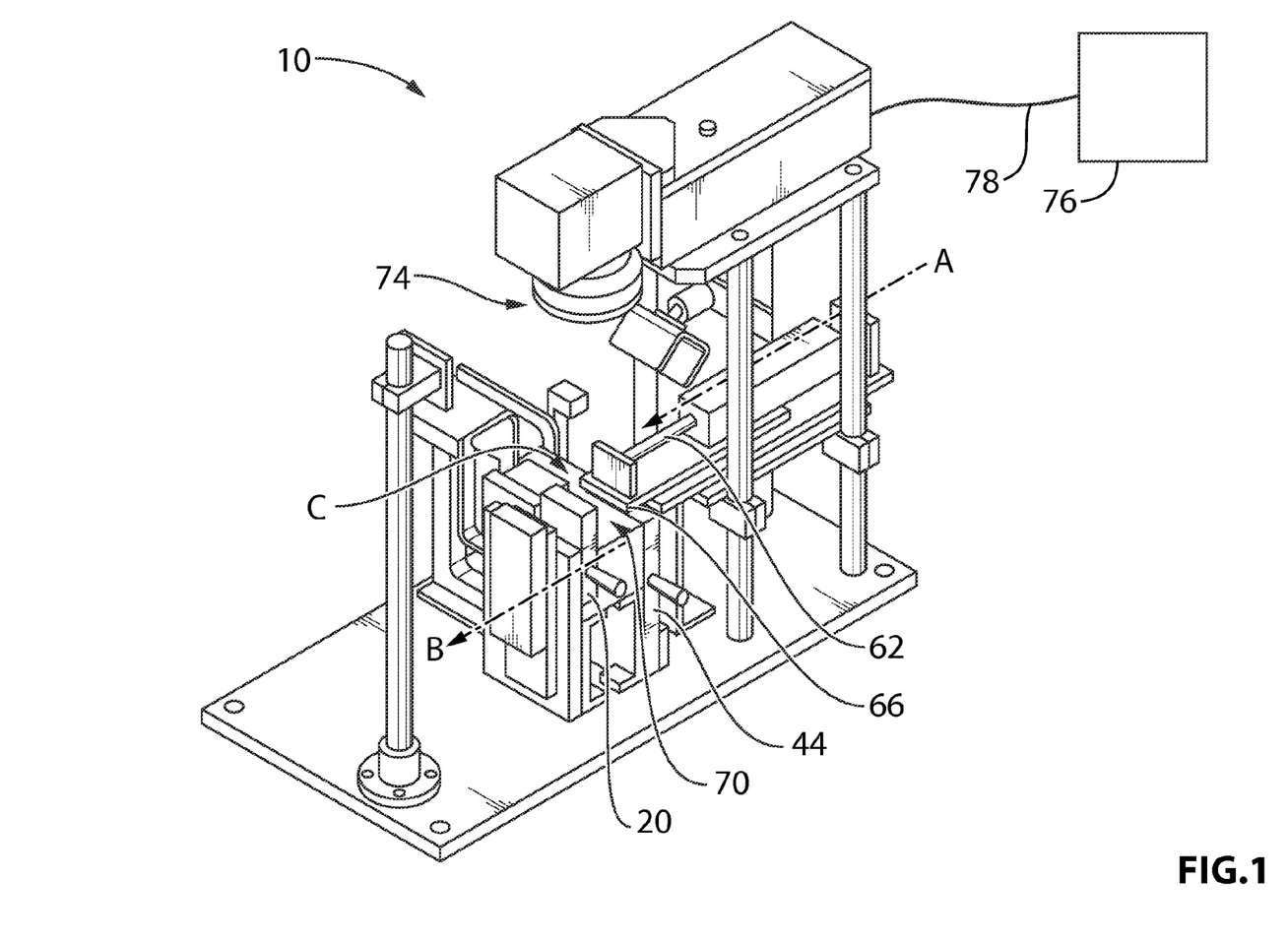
FIG. 1 is a top perspective view of an apparatus for feeding successive plates through an indicia marking process, in accordance with one embodiment.

With reference to FIG. 1, an exemplary embodiment of an apparatus 10 is shown to provide a general outline of the operation of the apparatus for feeding plate blanks 12 through a printing station 70 for an indicia marking process so as to produce a finished plate 16a and ordering said finished plates 16a in a receiving magazine 20. In some embodiments, the plate blanks 12 (FIG. 3) may be provided as VIN plates for later affixation to a corresponding vehicle. However one of skill in the art will appreciate from the instant disclosure that the apparatus 10 provided herein may be useful in other situations where it is required to produce finish plates 16a bearing information corresponding to a particular customizable product. Again, with reference to FIG. 1, a load magazine 44 and receiving magazine 20 are provided where the load magazine 44 holds a predefined plurality of plate blanks 12 and the receiving magazine 20 receives and holds a plurality of successively produced finished plates stacked in a sequential production order.

Plate blanks 12 are presented at a load magazine opening 48 such that an actuator arm 62 having an effector end region 66 can engage a single plate blank 12a and linearly move the single blank plate 12a along a travel path shown at A in the figures to a printing station 70. At the printing station 70, information specific to a given customizable product or vehicle, is marked on the single plate blank 12a to produce the finished plate 16a. Once the marking has been completed at the printing station 70 to produce a single finished plate 16a, the actuator arm 62 continues along the travel path shown at B to effect pushing of the single finished plate 16a into a receiving magazine opening 24.

Figure 2A:
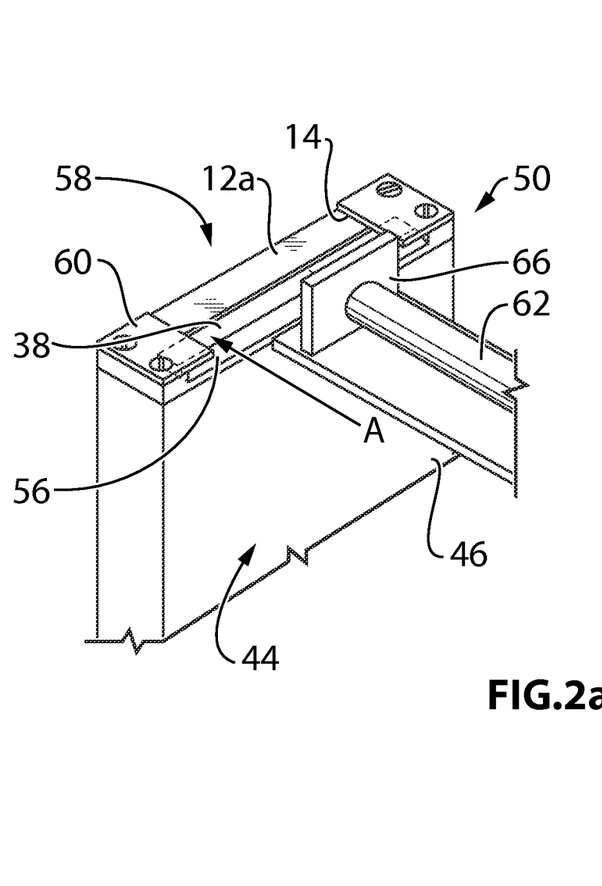
FIG. 2a is a top perspective view of a load magazine of the apparatus of FIG. 1.

In one embodiment, the load magazine opening 48 is provided near a load magazine top end region 50 of the load magazine 44 and the receiving magazine opening 24 is provided in a side wall 28 of the receiving magazine housing 22 between a receiving magazine top opposed end region 26a and a receiving magazine bottom opposed end region 26b of the receiving magazine 20, as is shown for example, in FIG. 2. For example, the relative location of the load magazine top opening 48 and the receiving magazine opening 24 are shown schematically in FIGS. 8a to 8b.

Figure 5A:
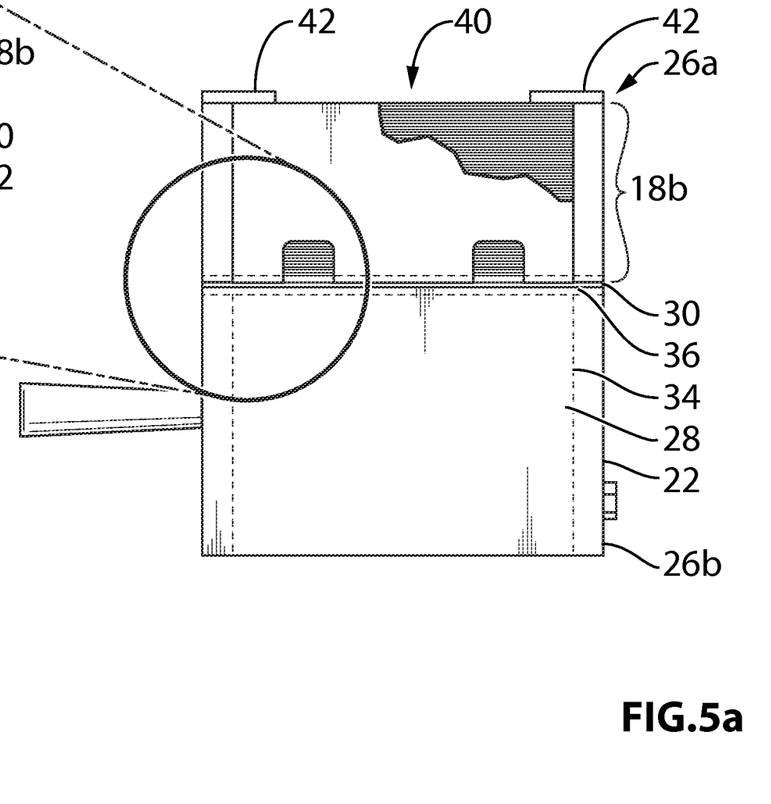
FIG. 5a is a partial cut-away side view of a receiving magazine of the apparatus of FIG. 1.

Once a given finished plate 16a is produced by way of marking indicia or at least one character thereon by a printing head 74, the actuator arm 62 moves it along travel path B, and the finished plate 16a is inserted in the receiving magazine opening 24 adjacent a previously finished plated 16b. In some exemplary embodiments, as shown for example, in FIGS. 5 and 7, where the receiving magazine top opening 40 is located at the opposed end region 26a of the receiving magazine 20, the finish plate 16a is installed under a previously finished plate 16b (FIG. 9) and thus the finished stack 18b of previously finished plates 16b grows. The actuator arm 62 then returns to a start position A1 to select a next single plate blank 12a from the stack 18a of plate blanks 12.

Figure 3:
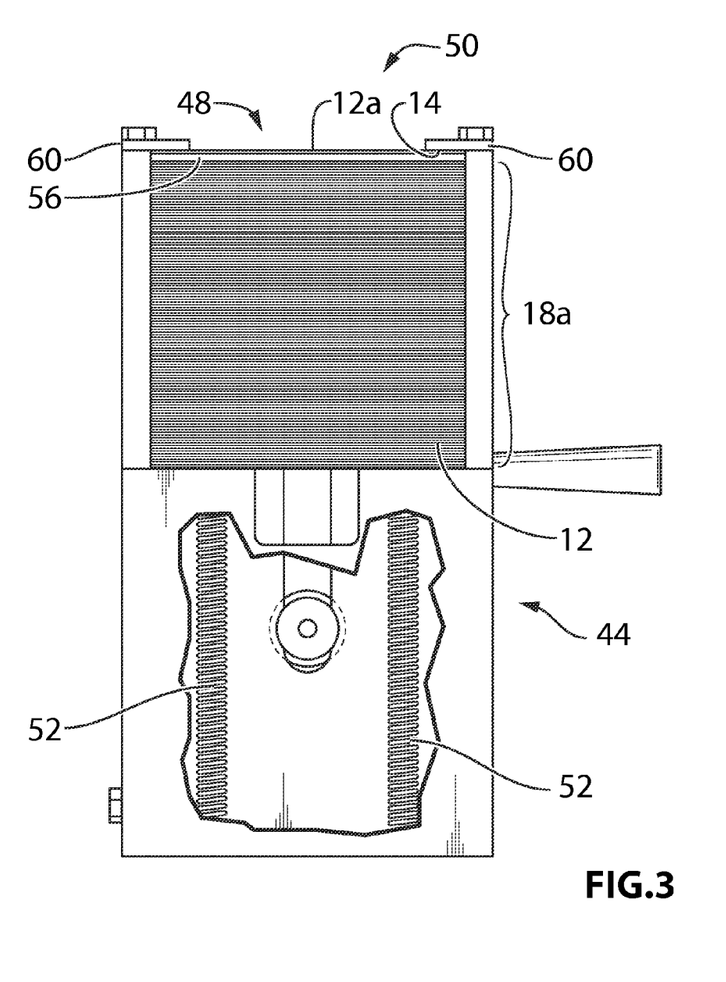

Turing now to FIGS. 2a and 3, the load magazine 44 is specifically discussed. The load magazine 44 includes a load magazine housing 46 forming the general body of the load magazine. The bottom of the load magazine housing 46 is fashioned to be substantially closed and the top end of the load magazine housing 46 has a load magazine opening 48 where the single plate blanks 12a are sequentially presented as a previous one thereof is removed. Near a load magazine top end region 50, a trailing side 58 of the load magazine housing 46 is open such that at least the uppermost portion (for example, at least the single plate blank 12a) of the stack of plate blanks 18a is exposed along one side, as shown, for example in FIG. 3. With the trailing side 58 of the uppermost portion of the load magazine housing 46 open, as the effector end region 66 of the actuator arm 62 effects removal of a singly presented plate blank 12a at the load magazine opening 48, the single plate blank 12a is removed from the trailing side 58. Once the single plate blank 12a is removed, the actuator arm 62 moves the single plate blank 12a toward the printing station 70 at position C, as shown, for example in FIG. 1.

As shown in FIG. 3, the stack of plate blanks 18a is maintained in the load magazine housing 46 in the upper portion thereof, which is open near at least an uppermost portion thereof such that a single one of the plate blanks 12a can be sequentially removed by the action of the actuator arm traveling along travel path A, as shown in FIG. 1. When the actuator arm 62 returns to the start position A1 (FIG. 8c), a next single plate blank 12a is presented at the load magazine top opening 48 under the action of a biasing means 52. In some embodiments, the load magazine 44 is designed to hold 120 blank VIN plates, however, other capacities for holding more or less plate blanks 12 may be provided, as required. Located in the bottom portion of the load magazine housing 46, are means for advancing the stack of plate blanks 18a towards the load magazine opening 48. In some embodiments, the means for advancing the stack of plate blanks 18a towards the load magazine opening 48 may be provided as a coil spring 52 or more than one coil springs. However, other suitable means, such as leaf springs, resilient elastomeric supports, pressurized air or other suitable fluid may be utilized to advance the stack of plate blanks 18a by way of upward bias on the bottom of the stack toward the load magazine opening 48. One of skill in the art would readily understand how to adapt the bottom portion of the load magazine housing 46 to employ each of the aforementioned means, as well as other means.

Figure 4:
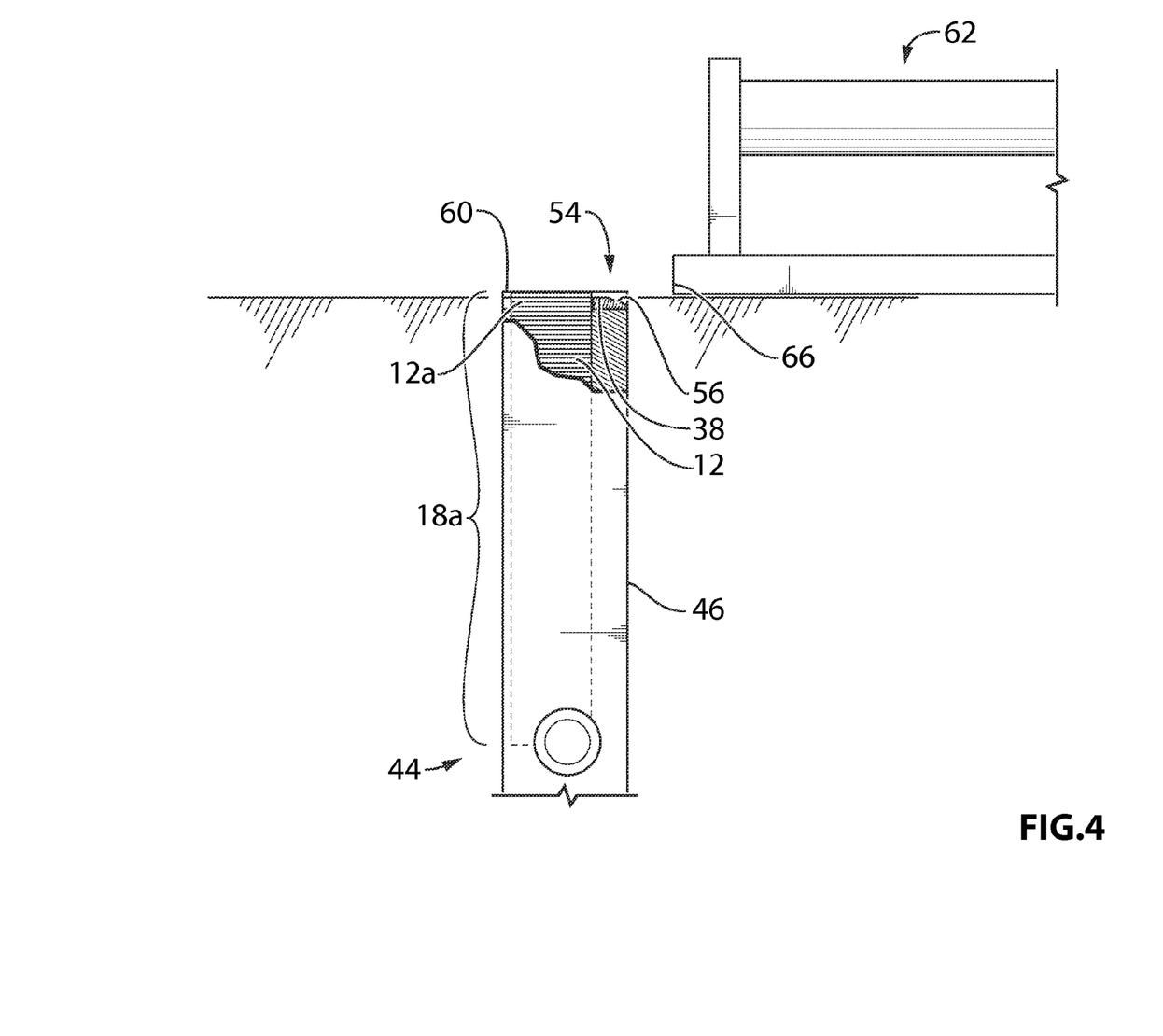
FIG. 4 is a schematic partial cut-away side view of the load magazine presenting a single plate blank to an actuator arm of the apparatus of FIG. 1.

In some embodiments, the stack of plate blanks 18a is maintained from exiting the load magazine opening 48 at the load magazine top end region 50 by way of at least one tab 60 as shown in FIGS. 2a, 3 and 4. A top surface 14 of the single plate blank 12a being presented for interaction with the effector end region 62 is in communication with an underside of the tab 60. In some embodiments, more than one tab 60, as shown in the figures, may be provided at opposing lateral sides of the load magazine opening 48. As a single plate blank 12a is removed from the top of the stack of plated blanks 18a, as shown for example in FIG. 8b, the next successive plate 12 in the stack is maintained in location by a bottom portion 68 of the effector end region 66. Once the effector end region 66 of the actuator arm 62 is retracted along travel path A, to start position A1, as shown, for example, in FIGS. 8a and 8d, the bottom portion 68 is no longer in contact with plate blank 12 and the stack of plate blanks 18a is able to advance upwardly under the bias of the means for advancing the stack of plate blanks 18a towards the load magazine opening 48 wherein the top surface 14 of the top plate, now the single plate blank 12a, is contacted against the bottom surface of the tab 60. In such a position, the next plate blank is presented for interaction with the effector end region 66.

Figure 2B:
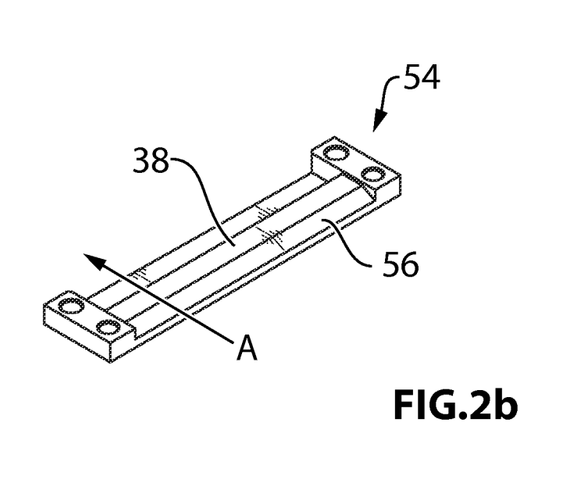

With reference specifically to FIGS. 2b and 4, there is provided an insert plate 54, near the load magazine opening 48, having a beveled leading edge 56. The insert plate 54 is coupled to, or in some embodiments, integrated into the top end region 50 of the load magazine 44 such that the beveled leading edge 56 is oriented in the direction of travel A of the actuator arm 62 as shown in FIG. 2a. The insert plate 54 is provided such that the plate blanks are maintained below the level of a top edge thereof, also termed herein as a flat deflection member surface 38, and the single plate blank 12a is presented for interaction with the effector end region 66, as shown in FIG. 4. The beveled leading edge 56, in some embodiments, provides a guide against which the effector end region 66 can slide upwardly to engage an edge of the single plate blank 12a for removing it from the load magazine along travel path A and moving the single plate to printing station 70. Once the effector end region 66 is retracted to position A1 the next plate blank is advanced for presentation as the single plate blank 12a.

Therefore, in some embodiments, the specific geometry of the load magazine top end region 50 of the load magazine 44 allows the actuator arm 62 to push one VIN plate out of the load magazine 44 at a time. The VIN plate moves along travel path A under the action of the actuator arm 62 to the printing station 70 where it is lazed by the printing head 74. The same actuator arm 62 then pushes the finished plate 16a, the completed VIN plate in some embodiments, into the receiving magazine 20 along travel path B. The receiving magazine 20 has a specific loading plate geometry to allow a single finished plate 16a in at a time, and slide the finished plate 16a under a previously finished plated 16b located in the receiving magazine 20 thereby maintaining the plates in order for later ordered usage. The actuator arm 62, with the effector end region 66, then returns to home or start position A1 and another plate pops up for presentation in the load magazine opening 48, as shown in FIGS. 4 and 8d.

Figure 7:
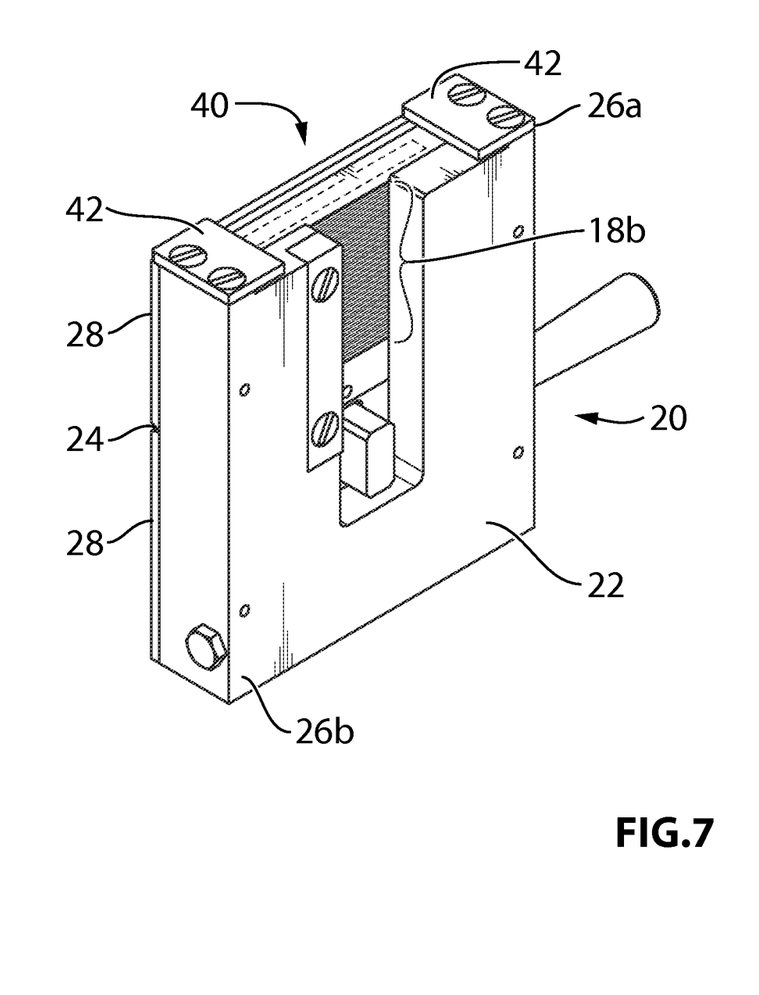
FIG. 7 is a top perspective view of the receiving magazine.

As noted above, once the marking on the plate blank has been done in the printing station 70 at position C as seen in FIG. 1 and FIGS. 8a to 8d, the actuator arm 62 effects travel of the now finished plate 16a along travel path B where it is inserted into the receiving magazine 20. With general reference to FIG. 5a, the receiving magazine 20 has a receiving magazine housing 22 for maintaining therein the stack of previously finished plates 18b. As shown in FIGS. 5a and 7, the stack of previously finished plates 18b, in some embodiments, is maintained in the receiving magazine housing 22 nearer the receiving magazine opposed top end region 26a having a receiving magazine top opening 40 located thereat. However, in other embodiments, it may be desirable to have the stack of finished plates 18b oriented nearer to a receiving magazine bottom end region 26b (not shown). At the receiving magazine top end region 26a, in some exemplary embodiments there is provided at least one retaining member 42 in reversible communication with the receiving magazine top opening 40 for selectively maintaining the stack of finished plates 18b from undesirably exiting the opening. Once the desired number of finished plates is received into the receiving magazine 20 or the receiving magazine capacity is full, the at least one retaining member 42 can be removed and the plates can be extracted in the completed order though the receiving magazine top opening 40. For example, the receiving magazine may be designed to hold up to 60 completed VIN plates, however other receiving magazine capacities may be provided, as required, to hold more or less finished plates 16a. Also, in some embodiments, as shown in FIGS. 5a and 7, more than one retaining member 42 may be provided, for example at opposing lateral sides of the receiving magazine top opening 40.

Figure 5B:
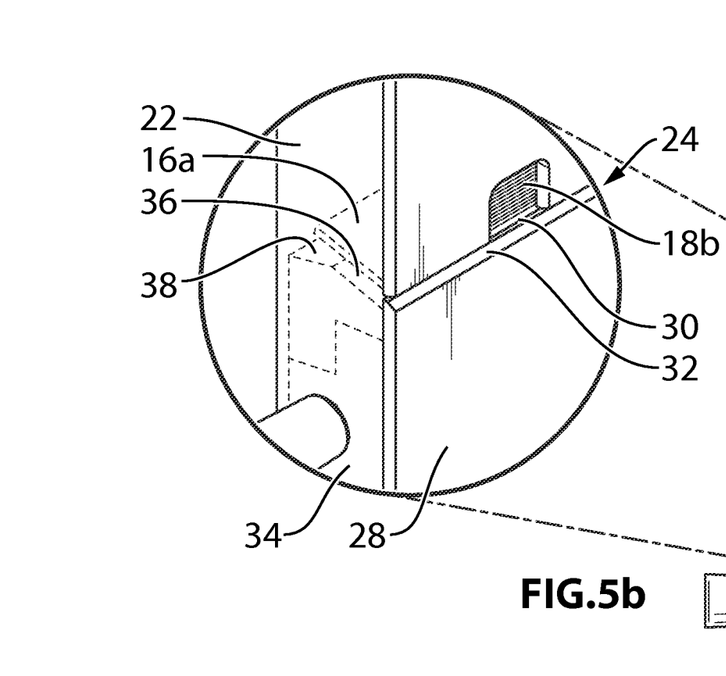
FIG. 5b is a magnified perspective view of a portion of an opening of the receiving magazine of FIG. 5a with a deflection member thereof shown in ghost lines.

Located in side wall 28 of the receiving magazine housing 20 is a receiving magazine opening 24. In some embodiments, the receiving magazine opening 24 is provided as a slot 30, as shown in FIG. 5b. As noted above, when the effector end region 66 pushes the finished plate 16a from the printing station position C along travel path B the finished plate 16a enters the slot 30. The slot 30 is operably aligned in the same plane as printing station position C such that the finished plate 16a can be inserted into the slot 30.

Figure 6:
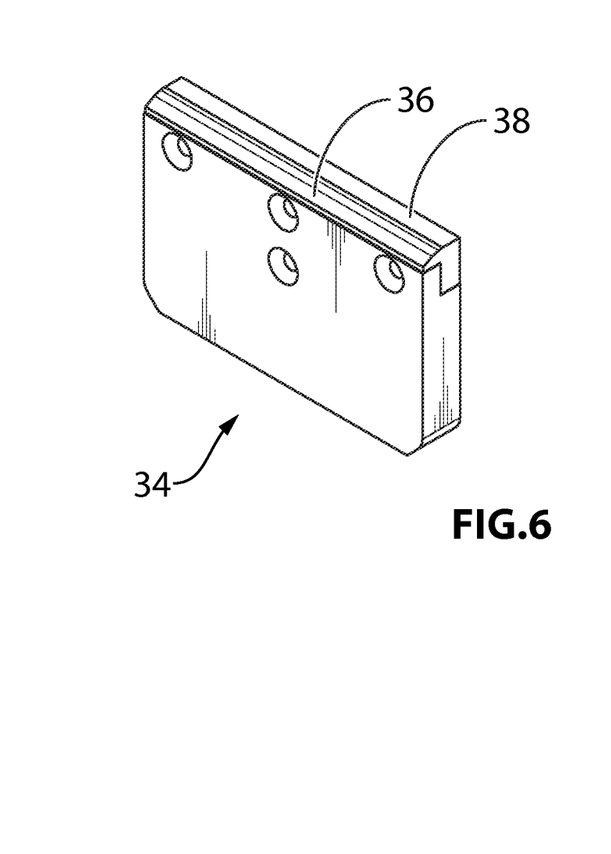
FIG. 6 is a top perspective view of the deflection member.
Figure 9:
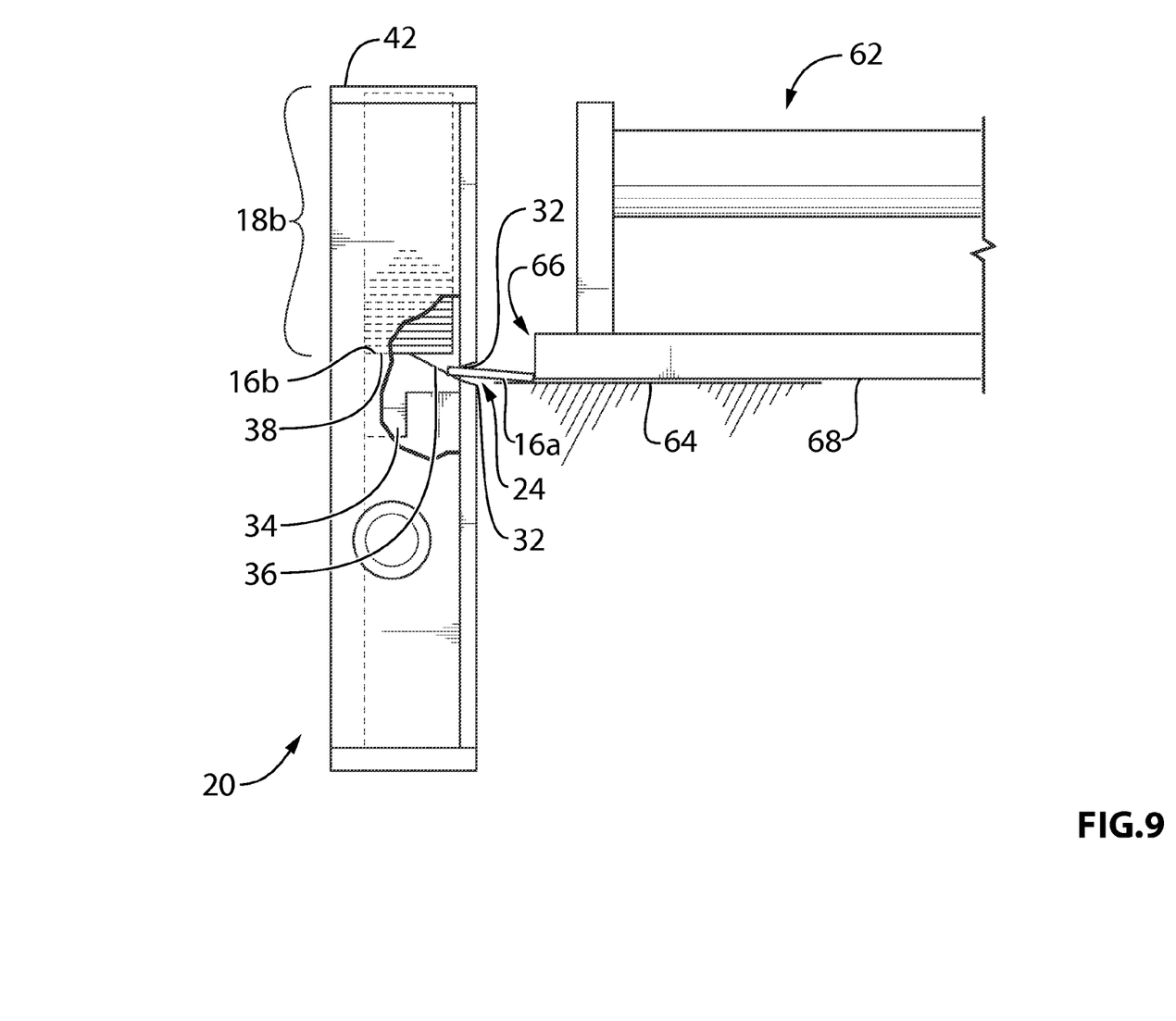
FIG. 9 is a schematic partial cut-away side view of the actuator arm inserting the finished plate into the receiving magazine opening with the finished plate in contact with a beveled leading edge of the deflection member.

Within the receiving magazine housing 22 there is a deflection member 34, shown in FIG. 6. FIG. 5a shows the deflection member 34 in position in the receiving member housing 22. The deflection member 34 has a deflection member beveled leading edge 36 located near the top end, as is shown in FIG. 5b and best in FIG. 6. The deflection member 34 and its beveled leading edge 36 serves to deflect the finished plate 16a such that it is oriented in a slight incline orientation as it moves through the slot 30 (FIG. 9). The deflection member also has a flat deflection member surface 38, shown in FIGS. 5b and 6. The flat deflection member surface 38 serves to support the stack of previously finished plates 18b with the bottom plate in the stack, the immediately previously finished plate 16b, resting thereon. As the actuator arm 62, moving in travel path B, causes the finished plate 16a to move into the slot 30, the finished plate 16a contacts the deflection member beveled leading edge 36 and becomes inclined such that it slightly lifts the previously finished plate 16b and the finished plate 16a is slidingly inserted under the previously finished plate 16a thereby causing the stack of finished plates 18b to grow. The finished plate 16a entering the slot 30 and inclined to be inserted under the previously finished plate 16b is shown in FIG. 9, with the stack of finished plates 18b resting on the flat deflection member surface 38.

In order that the finished plate 16a can be upwardly deflected for insertion to the bottom of the stack of finished plates 18b, the deflection member beveled leading edge 36 is aligned with the slot 30, as is best shown in FIG. 9. In some embodiments, the deflection member beveled leading edge 36 is intermediately aligned with the slot 30, as shown in the figures.

With reference to FIGS. 5b and 9, the slot 30 generally shown and termed the receiving magazine opening 24, in some embodiments, has contoured edges 32. These receiving member opening edge contours 32, provided in some embodiments, serve to assist in aligning the finished plate 16a with the receiving magazine opening 24 such that the finished plate can be inserted into the receiving magazine housing 22 and contact the deflection member beveled leading edge 36.

Figure 8A:
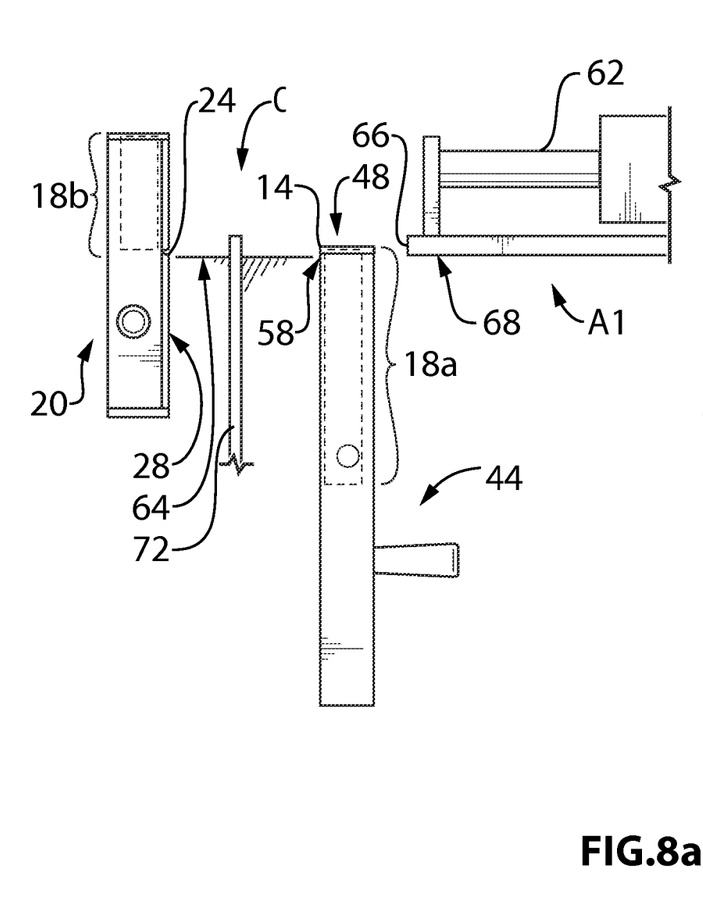
FIGS. 8a to 8d are schematic partial cut-away side views of the receiving magazine, the load magazine and the actuator arm in the sequence of dispensing a plate blank from the load magazine, marking the plate blank and inserting a finished plate in the receiving magazine.
Figure 8B:
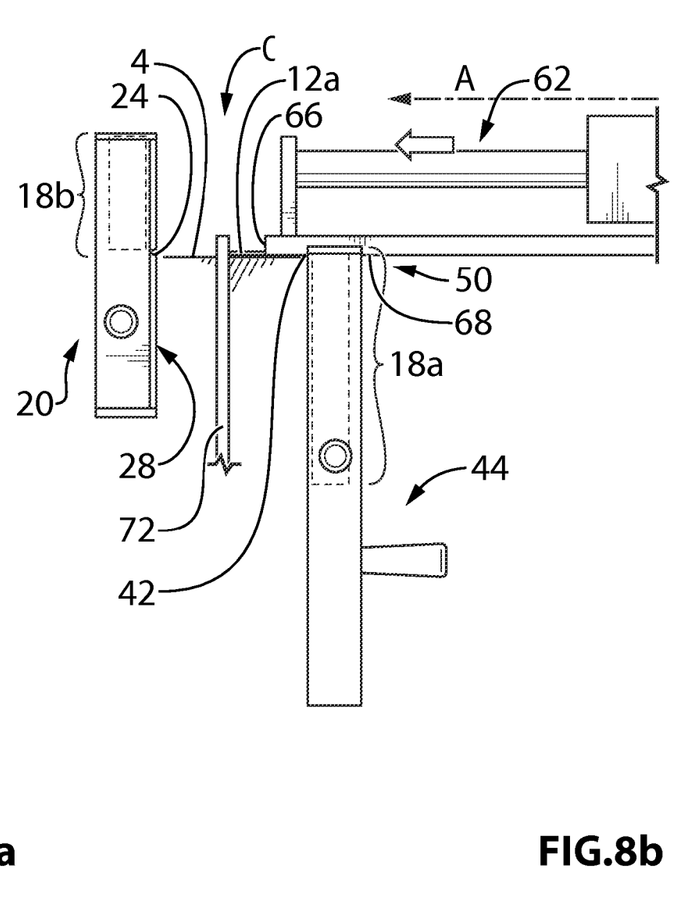
Figure 8C:
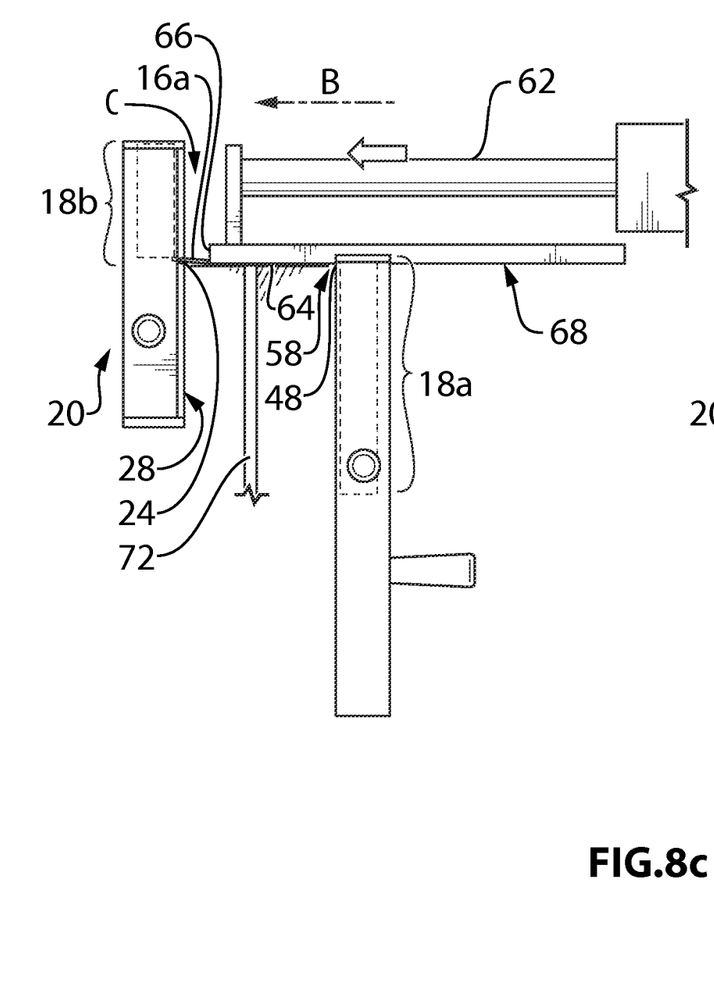
Figure 8D:
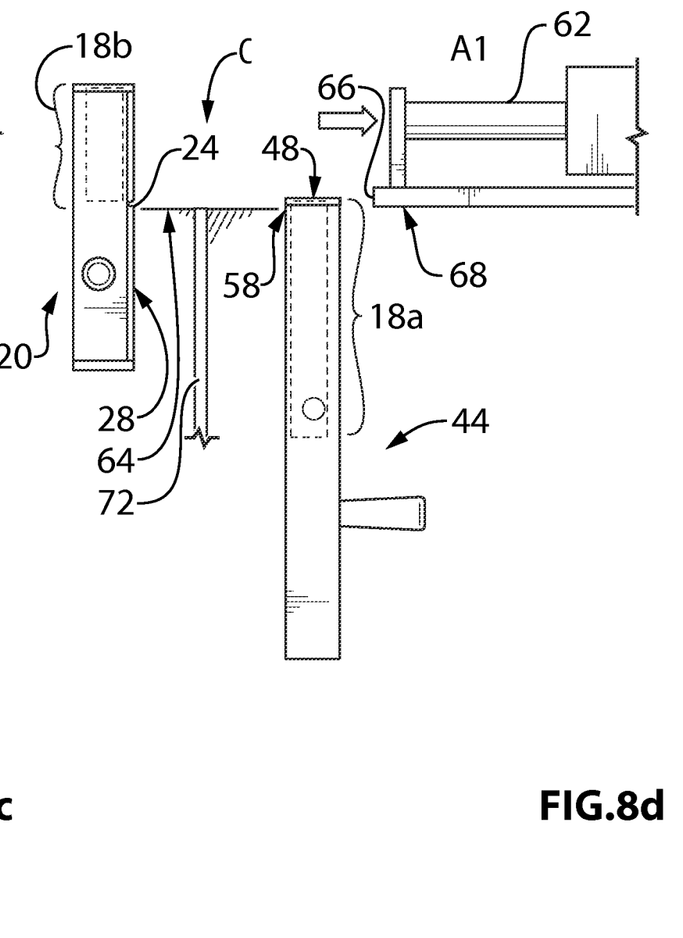

FIGS. 8a to 8d generally and schematically show the plate blanks 12 being maintained as a stack of plate blanks 18a in the load magazine housing 44 and being removed therefrom, moved through the printing station at C to produce the finished plate 16a, and the actuator arm 62 effecting insertion of the finished plate 16a into the receiving magazine 20 under the previously finished plate 16b. In FIG. 8a, the actuator arm 62 with its associated effector end region 66 is shown in the starting position A1. The single plate plank 12a is presented at the load magazine opening 48. In FIG. 8b, the actuator arm 62 travels along travel path A, across the load magazine top end region 50 where the effector end region 66 moves up the beveled leading edge 56 and pushes the single plate blank 12a from the top of the stack of plate blanks 18a. Once the single plate blank 12a has been removed or dispensed from the top of the stack of plate blanks 18a, the bottom portion of the effector end region 68 fills in the space in the load magazine opening 48 from where the single plate blank 12a has been removed. The actuator arm then stops along travel path A at printing station position C where the printing head 74 marks the plate blank 12a and thereby produces a finished plate 16a. In some embodiments, there is provided a printing station plate blank stopper 72 as is shown schematically particularly in FIGS. 8a to 8d and 9. The printing station plate blank stopper 72 is movable in a vertical orientation to selectively depend through the surface 64 which supports the plate blank 12a in the printing station 70. The movement of the printing station plate blank stopper 72 through the printing station surface 64 which supports the plate blank 12a in the printing station is co-ordinated to be presented above the surface 64 when the plate blank 12a is moved into the printing station, under the effect of the actuator arm 62, such that the plate blank 12a abuts the printing station plate blank stopper 72 when the actuator arm 62 stops with the plate blank 12a in the printing station 70 at position C, as shown in FIG. 8b. The interaction of the plant blank 12a against the printing station plate blank stopper 72 and the effect of the actuator arm serves to align the plate blank 12a in the desired position in the printing station 70 at position C for marking the indicia thereon. Once the marking of the indicia has been done, the printing station plate blank stopper 72 is co-ordinatingly retracted below the surface 64 which supports the plate blank 12a in the printing station 70 such that the finished plate 16a can be moved under effect of the actuator arm 62 along travel path B, as shown in FIG. 8c.

Turning now to FIG. 8c, once the finished plate 16a has been produced, the actuator arm 62 continues to travel along travel path B where the finished plate 16a is received in the receiving magazine housing 22 via the receiving magazine opening 24. As noted above, the finished plate 16a contacts the deflection member beveled leading edge 36 thereby inclining it upwardly such that it is inserted under a previously finished plate 16b (FIG. 9) in the stack of previously finished plates 18b. As shown in FIG. 8d, once the finished plated is inserted into the stack of previously finished plates 18b, the actuator arm 62 is returned to the start position A1 where, in doing so, the bottom portion of the effector end region 68 is vacated from the load magazine opening 48 allowing a successive plate blank 12 in the stack of plate blanks 18a to advance into position to become said presented single plate blank 12a. The sequence as hereinabove generally described and shown in FIGS. 8a to 8d is repeated so as to produce the stack of finished plates 18b in the predetermined order.

With regard to the printing station mentioned above and shown, in particular in FIG. 1, the printing station 70 is provided information to be printed on the plate blanks corresponding with the specific customizable product. For example, the printing station 70 is supplied with information specific to produce each finished plate 16a in sequential order such that the resultant stack 18b of previously finished plates in the receiving magazine 20 is provided in the required order to affix to the particular vehicles (or provided with the customizable product) as the vehicles are produced on an assembly line. Additionally, the printing station 70 has a printing head 74, which, in exemplary embodiments, may be provided with a laser printing head to etch the required information onto a single plate blank 12a. However, in other exemplary embodiments, not shown, the print station may be provided with an inking print head to print on the plate blanks, an embossing print head to stamp the required information on the plate blanks, or an engraving head, to name a few examples, thereby providing the indicia markings.

The printing station 70, in some embodiments, for example as shown in FIG. 1, may include a data storage device 76 configured to supply data via a data input line 78 to be marked on the plate blanks 12. In some embodiments, the data storage device 76 may be a general use computer. The data storage device 76 is configured to supply the marking information to the printing station 70 in the required order such that each single plate blank 12a has marked thereon information specific to the customizable product as each single plate blank is moved through the printing station 70 to produce the finished plates 16a. As the actuator arm 62 moves each finished plate 16a into the receiving magazine 20, the finished plates 16a are entered into the stack of previously finished plates 18b in the order that the data storage device 76 is programed to supply the marking information to the printing station 70. The data storage device 76 is thus programed to mark each plate blank 12a and thereby produce a finished plate 16a with information specific to said finished plate 16a in a predetermined sequence. As each plate is finished and installed in the receiving magazine 20 and the actuator arm 62 returns to the start position A1 to, in the next plate printing cycle, push a successive plate blank 12a into he printing station at C, the data storage device 76 provides the marking information specific to that plate to the printing head for marking on the plate blank 12a instantly in the printing station 70. Repetition of this cycle therefore produces a stack of finished plates 18b in the predetermined order for later affixation to, or inclusion with the customizable product, for example a vehicle. In some embodiments, the printing station itself may also be preprogramed with the predetermined plate marking sequence.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention.

It is to be understood that the above description it is intended to be illustrative, and not restrictive. Many other embodiments will be apparent to those skilled in the art, upon reviewing the above description. The scope of the invention should, therefore, be determined with reference to the appended claims, along with the full scope of equivalents to which such claims are entitled.

Although the present invention has been described with reference to specific example embodiments, it will be evident that various modifications and changes may be made to these embodiments without departing from the broader spirit and scope of the disclosed subject matter.

What is claimed is:

1. An apparatus for feeding successive plate blanks through an indicia marking process so as to produce finished plates stacked and ordered in a receiving magazine, the apparatus comprising:
   a load magazine operably configured to hold a plurality of plate blanks and successively present a single plate blank at a load magazine opening thereof; and
   an actuator arm operable to interact with said single plate blank at said opening to linearly move said single plate blank along a travel path through the indicia marking process to successively produce the finished plates, and successively deliver the finished plates into a receiving magazine via a receiving magazine opening thereof such that the finished plates are successively inserted in order into a receiving magazine adjacent previously finished plates maintained in the receiving magazine so as to form the stack of finished plates;
   wherein said receiving magazine opening is located in a side wall of a receiving magazine housing configured to receive therethrough a single plate into said receiving magazine housing.

2. The apparatus as defined in claim 1, wherein said load magazine opening is located at a load magazine top end region.

3. The apparatus as defined in claim 1, wherein said finished plates are installed under said previously finished plates.

4. The apparatus as defined in claim 3, the receiving magazine including a deflection member having a beveled leading edge located within said receiving magazine housing, said beveled leading edge operably aligned with said receiving magazine opening for deflecting said finished plates under said previously finished plates maintained in said receiving magazine.

5. The apparatus as defined in claim 4, wherein said receiving magazine opening is a slot and the edges of said slot are contoured for aligning said finished plate into said slot.

6. The apparatus as defined in claim 1, further comprising a printing station plate blank stopper operable to selectively depend through a support surface on which the single plate blank is linearly moved for abutting thereagainst and aligning the single plate blank in said indicia marking process; said printing station plate blank stopper being retractable below said support surface once said indicia marking process is completed.

7. An apparatus for feeding successive plate blanks through an indicia marking process so as to produce finished plates stacked and ordered in a receiving magazine, the apparatus comprising:
   a load magazine operably configured to hold a plurality of plate blanks and successively present a single plate blank at a load magazine opening thereof; and
   an actuator arm operable to interact with said single plate blank at said opening to linearly move said single plate blank along a travel path through the indicia marking process to successively produce the finished plates, and successively deliver the finished plates into a receiving magazine via a receiving magazine opening thereof such that the finished plates are successively inserted in order into the receiving magazine adjacent previously finished plates maintained in the receiving magazine so as to form the stack of finished plates;
   a receiving magazine housing top opening for removing said finished plates stacked and ordered in said receiving magazine; and
   at least one retaining member in reversible communication with said receiving magazine housing top opening for selectively preventing said finished plates from exiting said receiving magazine house top opening.

8. The apparatus as defined in claim 7, said actuator arm having an effector end region adapted for engaging an edge of said single plate blank for removing said single plate blank from said load magazine opening; and
   wherein said effector end region in engaging with said single plate blank pushes said single plate blank into said indicia marking process for marking indicia on said single plate blank and producing said finished plate.

9. The apparatus as defined in claim 8, wherein said actuator arm effects pushing of said finished plates into said receiving magazine opening.

10. An apparatus for feeding successive plate blanks through an indicia marking process so as to produce finished plates stacked and ordered in a receiving magazine, the apparatus comprising:
   a load magazine operably configured to hold a plurality of plate blanks and successively present a single plate blank at a load magazine opening thereof; and
   an actuator arm operable to interact with said single plate blank at said opening to linearly move said single plate blank along a travel path through the indicia marking process to successively produce the finished plates, and successively deliver the finished plates into a receiving magazine via a receiving magazine opening thereof such that the finished plates are successively inserted in order into the receiving magazine adjacent previously finished plates maintained in the receiving magazine so as to form the stack of finished plates;
   wherein said plurality of plate blanks are maintained in said load magazine in a stacked arrangement, said load magazine further comprising a biasing means configured for advancing said plurality of plate blanks towards said load magazine opening such that successive single plate blanks are presented for interaction with the actuator arm.

11. The apparatus as defined in claim 10, wherein said load magazine opening includes at least one tab for abutting thereagainst at least a portion of a top surface of said single plate blank and a beveled leading edge located in the direction of travel of the actuator arm; said load magazine opening having a trailing side configured to allow dispensing of said single plate blank from said load magazine by an effector end region of said actuator arm.

12. The apparatus as defined in claim 10, wherein the indicia marking process is provided through a printing station having a printing head, said printing head being provided as a laser etching head, an ink printing head, an embossing head or an engraving head for marking said indicia on said single plate blank; and
   wherein said printing station is adapted to receive predetermined information corresponding to said indicia to be marked on said single plate blank to produce said finished plate via said printing head.

13. The apparatus as defined in claim 12, said predetermined information corresponding to desired markings for sequentially marking said presented single plate blanks such that said finished plates are produced in a predetermined order.

* * * * *